United States Patent Office 3,307,922
Patented Mar. 7, 1967

3,307,922
EXTRACTION OF LITHIUM VALUES FROM BRINES CONTAINING CALCIUM SALTS IN THE PRESENCE OF AMMONIA
Robert D. Goodenough and Remigius A. Gaska, Midland, Mich., assignors to The Dow Chemical Company, Midland, Mich., a corporation of Delaware
No Drawing. Filed Aug. 5, 1963, Ser. No. 300,066
8 Claims. (Cl. 23—312)

This invention relates to the extraction of lithium values from brines containing both lithium salts and calcium salts in solution. Other salts, normally present in brines, e.g., strontium salts may also be present.

Lithium metal is finding increasing use in industrial operations. Formerly a principal source therefor was largely such ores as spodumene, lepidolite, and amblygonite, which after preliminary beneficiation, were treated with sulfuric acid to obtain the lithium values.

Lithium is now also obtained from brines containing lithium salts. One of the ways of obtaining lithium values from brines containing them is to extract the lithium salts therefrom by employing certain aliphatic alcohols. Such an extraction technique is successful in separating the lithium values from certain other salts there present, e.g., potassium and sodium salts, but has been quite unsatisfactory to separate the lithium values from calcium salts there present. The persistence of the calcium salts in the lithium compounds so separated has been a serious objection to the extraction technique for the separation of lithium values from brines. Accordingly, a need exists for a more effective method to attain this end.

The principal object of the invention is to provide an improved method of recovering lithium values from brines containing both lithium salts and calcium salts.

The method by which this and related objects are attained will be made clear in the ensuing description and is succinctly defined in the appended claims.

The invention consists essentially of admixing an immiscible monoalkanol or a ketone with a brine which contains both lithium salts and calcium salts and during or subsequent thereto admixing ammonia with the resulting mixture for a time sufficient for the monoalkanol or ketone to extract an appreciable portion of the lithium salts from the brine while maintaining the mixture in a state of agitation which is sufficient to insure substantial uniformity; allowing the monoalkanol or ketone and the brine to statify into an upper organic phase containing a substantial portion of the lithium salts present and a lower aqueous phase containing a substantial portion of the calcium present; and, thereafter separating the organic phase from the aqueous phase.

In practicing the invention, the organic solvent employed is selected from the class consisting of aliphatic monoalkanols containing from 3 to 5 carbon atoms per molecule and aliphatic ketones containing from 5 to 8 carbon atoms per molecule. Illustrative of the organic solvents to employ are n-butanol and methyl isobutyl ketone. The ratio of the monoalkanol or the ketone to the brine is not critical and may be anywhere between about 0.1 and about 10. A ratio by volume of the monoalkanol or ketone to the brine of between about 1 and 5 is commonly employed.

The ammonia may be introduced as either a liquid or a gas. It is employed in an amount to provide between about 5 and about 40 percent based on the weight of the brine present.

The brine may be any brine which contains sufficient lithium to make the treatment thereof, for the purpose of recovering the lithium, economically feasible. A large number of inland brines such as those produced in Michigan and Oklahoma are rather high in their lithium content. A disadvantage of these brines, however, is that they contain calcium salts which have heretofore been difficult to separate from the lithium obtained. It is preferable that the brine be substantially free of magnesium. A number of natural brines which contain lithium and calcium salts are substantially magnesium-free. If not, the magnesium may be removed prior to treatment according to the invention by admixing therewith an alkali metal or alkaline earth hydroxide which will cause the magnesium values to precipitate as magnesium hydroxide and may thereafter be separated by such means as filtration. The magnesium need not be removed for the practice of the invention, however.

The ketone or monoalkanol and the brine must be kept in a state of agitation in the presence of the ammonia to a sufficient extent to maintain the mixture in a state of equilibrium. The temperature is not highly critical and may be anywhere between 0° and 100° C., a temperature between 5° and 75° being commonly employed.

Any suitable apparatus provided with a vessel and a mixing device operating therein may be employed to carry out the invention and from which the phases may be successively removed. The most satisfactory mixing apparatus to employ in the practice of the invention is that described and claimed in U.S. patent application S.N. 299,914, filed concurrently herewith, now U.S. Patent No. 3,206,172, of which we are a coinventor's. This apparatus comprises a mixing vessel provided with a vertically reciprocating, magnetically actuated stirrer and permits continuous introduction of ammonia. It also provides for sampling of the phases by merely ceasing agitation temporarily and opening an appropriate valve forming part of the apparatus. The phases may be withdrawn and additional brine and organic solvent provided without dismantling the apparatus.

The apparent pH of the brine should be between about zero and about 12 and is usually between about 2 and about 7. The natural brines which are most commonly employed in the practice of the invention usually have an apparent pH of between about 4 and about 6 and are fully satisfactory without pH adjustment. When such brines have been first treated with an alkali metal or an alkaline earth hydroxide to precipitate out magnesium there present, in the form of magnesium hydroxide, it is recommended that the pH be adjusted downward to less than 8 by the admixture therewith of a suitable agent, e.g., hydrochloric acid.

The time required for the extraction operation should be sufficient to permit extraction of a substantial portion of the lithium present. The more efficient time to employ is that which permits the monoalkanol or ketone to become substantially saturated with the lithium salts present. The length of time actually employed is dependent upon the ratio of monoalkanol or ketone to the brine employed, upon the adequacy of the stirring provided, and the sufficiency of the supply of ammonia provided. It is preferred that the ammonia be introduced prior to the start of stirring but it may be introduced continuously or intermittently during the mixing. The pressure should be sufficient to force the ammonia into the solution. An apparatus which permits periodic sampling of the organic and aqueous phases by merely discontinuing agitation for an interval such as that described in S.N. 299,914, is preferred.

Best results are obtained by repeating the extraction operation a number of times employing fresh monoalkanol or ketone. The number of times the extraction operation is repeated is dependent upon the distribution coefficient of the system, the concentration of the solute and solvent, and the economics since each successive extraction operation will be carried out on a brine containing less and less of the lithium values.

The lithium values in the monoalkanol or ketone may be removed therefrom, if desired, by contacting the monoalkanol or ketone, preferably by countercurrent flow, with fresh water and thereafter separating the lithium values from calcium values and from water. Such a process is known in the solvent extraction art and is usually referred to as stripping. The lithium values may be recovered as the salt from either water or the organic solvent, as by evaporation. It is often desirable, however, to use the lithium salts in the dissolved state and, accordingly, the salts are retained in solution.

After stripping the lithium and calcium values from the organic phase, the latter can be reused again as the extracting solvent. The brine effluent and the water-strip solution can be combined and stripped free of ammonia using a conventional separation technique such as distillation.

The practice of the invention is illustrated below by examples, designated by numbers. Attempts to attain the objectives of the invention by practice which is not in accordance with the invention are also set out for purposes of contrast and are designated by letters.

The following examples are illustrative of the practice of the invention.

An inland processed brine having a specific gravity of 1.447 and the following analysis by weight was employed in the examples and comparative runs:

| | Percent |
|---|---|
| $CaCl_2$ | 39.4 |
| $LiCl$ | 0.07 |
| $SrCl_2$ | 0.5 |
| $KCl$ | 2.9 |
| $NaCl$ | 0.6 |

Balance substantially water.

EXAMPLE 1

20 milliliters of the brine having the above analysis were placed in the reaction chamber provided with the stirring mechanism described and claimed in copending application S.N. 299,914. 40 milliliters of n-butanol were added to the brine in the reaction chamber. Thereafter, the apparatus was assembled and 9.9 grams of ammonia introduced into the reaction chamber, while maintaining the temperature at 25° C., for a period of 1.5 hours while agitating the mixture in order to maintain a state of equilibrium.

At the end of this period, agitation was discontinued, both phases sampled while still in contact with ammonia and the samples analyzed for the calcium and lithium content. The results set out in Table I below show the following facts: (1) the weight of calcium and of lithium present in each phase, (2) the ratio of the lithium in the organic phase to that in the aqueous phase, (3) the ratio of calcium in the organic phase to that in the aqueous phase, (4) the preference to the lithium over calcium shown by the organic phase to that shown by the aqueous phase as expressed by the ratio of (2) to (3), i.e., $$\frac{\text{ratio of lithium in the organic phase to that in the aqueous phase}}{\text{ratio of calcium in the organic phase to that in the aqueous phase}},$$

and (5) the percentage of lithium based on the total of lithium plus calcium ultimately recovered from the organic phase. In the table, (2) and (3) above are designated distribution ratio and (4) above is designated selectivity.

TABLE 1

| | Lithium | Calcium | Selectivity |
|---|---|---|---|
| Organic Phase | 0.12 mg | 0.01 g | |
| Aqueous Phase | 1.02 mg | 1.53 g | |
| Distribution Ratio | 0.12/1.02=0.1176 | 0.01/1.53=0.00653 | 0.1176/0.00653=18.0. |
| Percent of each metal based on weight of total lithium and calcium recovered from organic phase. | 1.2% | 98.8% | |

Reference to the results of Example 1 as set out in Table I shows that, in the presence of ammonia, there is a low proportion of calcium values in the organic phase. If more of the lithium is desired to be separated from the brine, the aqueous phase may be repeatedly treated with additional monoalkanol or ketone in accordance with the invention until only a negligible amount of values remain in the brine.

The following test runs were made for comparative purposes.

Comparative Run A

This run was exactly the same as that of Example 1 except that no ammonia was employed. The results are set out in Table II below.

TABLE II

| | Lithium | Calcium | Selectivity |
|---|---|---|---|
| Organic Phase | 0.45 mg | 0.21 g | |
| Aqueous Phase | 0.38 mg | 1.07 g | |
| Distribution Ratio | 0.45/0.38=1.184 | 0.21/1.07=0.196 | 1.184/0.196=6.0. |
| Percent of each metal based on weight of total lithium and calcium recovered from organic phase. | 0.21% | 99.79% | |

Reference to the results of Comparative Run A as shown in Table II, in contrast to those of Example 1, shows that the presence of ammonia markedly depresses the solubility of the calcium salts in the organic phase, thereby allowing a desirably high proportion of the lithium over the calcium to be extracted from the brine and to be dissolved in the organic phase.

EXAMPLE 2

This example of the invention was performed, following the procedure, using the same amount of ammonia, and under the conditions of Example 1 except that the temperature was maintained at 10° C. At the end of the 1.5-hour period, agitation was stopped and the organic and aqueous phases sampled. The samples showed the results set out in Table III.

TABLE III

|  | Lithium | Calcium | Selectivity |
|---|---|---|---|
| Organic Phase | 0.145 mg | 0.014 g |  |
| Aqueous Phase | 0.560 mg | 0.817 g |  |
| Distribution Ratio | 0.145/0.560=0.258 | 0.014/0.817=0.01713 | 0.258/0.01713=15.0 |
| Percent of each metal based on weight of total lithium and calcium recovered from organic phase. | 1.03% | 98.97% |  |

Reference to the results of Example 2, as set out in Table III, shows that excellent selectivity of lithium values by the organic phase to that of the aqueous phase occurs in the practice of the invention and that a temperature of 10° C. is substantially as satisfactory as that of 25° C.

*Comparative Run B*

Example 2 was repeated except that no ammonia was employed. The results are set out in Table IV below.

TABLE IV

|  | Lithium | Calcium | Selectivity |
|---|---|---|---|
| Organic Phase | 0.205 mg | 0.110 g |  |
| Aqueous Phase | 0.300 mg | 0.749 g |  |
| Distribution Ratio | 0.205/0.300=0.6833 | 0.110/0.749=0.1470 | 0.6833/0.1470=4.65 |
| Percent of each metal based on weight of total lithium and calcium recovered from organic phase. | 0.188% | 99.812% |  |

The examples and the comparative runs show that the presence of ammonia in the agitated mixture of monoalkanol and brine containing both lithium and calcium salts causes the solubility of the calcium values in the alcohol to be depressed and thereby permit a desirable disproportionate amount of the calcium to remain dissolved in the brine, but to have but little effect on the solubility of the lithium values in the monoalkanol.

The use of a $C_5$ to $C_8$ aliphatic ketone instead of the monoalkanol gives comparable results. For a more complete separation of the lithium from the brine, substantially free of calcium, the extraction of a given quantity of brine is repeated with fresh monoalkanol or ketone until continued extraction is not economically warranted.

Having described our invention what we claim and desire to protect by Letters Patent is:

1. The process of recovering lithium values from a brine containing lithium salts and other salts dissolved therein including calcium salts which comprises admixing with said brine an organic solvent selected from the class consisting of $C_3$ to $C_5$ monoalkanols and $C_5$ to $C_8$ aliphatic ketones in a ratio of the organic solvent to the brine of between about 0.01 and about 10 by volume, in the presence of ammonia in a ratio of between about 5% and 40% thereof based on the weight of the brine, at between about 0° and about 100° C., and at a pH value of between about zero and about 12, while agitating the mixture to maintain a substantially uniform state of equilibrium therein, for a period of time sufficient to permit the organic solvent to extract a substantial portion of the lithium values from the brine, substantially discontinuing agitation to provide a separation of an upper organic phase containing a substantial portion of the lithium values and a lower aqueous phase containing a substantial portion of the calcium values and separating the organic phase from the aqueous phase.

2. The process according to claim 1 wherein the organic solvent is a $C_3$ to $C_5$ monoalkanol.

3. The process according to claim 1 wherein the organic solvent is n-butanol.

4. The process according to claim 1 wherein the organic solvent is methyl isobutyl ketone.

5. The process according to claim 1 wherein the temperature is between about 5° and 75° C.

6. The process according to claim 1 wherein the pH value is between 2 and 7.

7. The process according to claim 1 wherein the ratio of organic solvent to brine by values is between about 1 and about 5.

8. The process according to claim 1 wherein the process is carried out in a continuous state of agitation provided by a vertically reciprocating magnetically actuated stirrer until the organic solvent, is substantially saturated with lithium salts extracted from the brine.

References Cited by the Examiner

UNITED STATES PATENTS

| 1,515,001 | 11/1924 | Girsewald | 23—37 X |
| 1,955,016 | 4/1934 | Prins | 23—312 X |
| 2,443,168 | 6/1948 | Robson | 23—312 |
| 2,446,868 | 8/1948 | Cunningham | 23—312 |

OTHER REFERENCES

West: Metallurgia, vol. XLIII, No. 225, January 1951, pp. 42–43. (Copy in Group 180.)

NORMAN YUDKOFF, *Primary Examiner.*

S. J. EMERY, *Assistant Examiner.*